United States Patent
Jung

(10) Patent No.: US 8,130,797 B2
(45) Date of Patent: Mar. 6, 2012

(54) METHOD AND APPARATUS FOR MULTIPLEXING/DEMULTIPLEXING MULTI-PROGRAMS

(75) Inventor: Choon-sik Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 11/773,620

(22) Filed: Jul. 5, 2007

(65) Prior Publication Data

US 2008/0123692 A1 May 29, 2008

(30) Foreign Application Priority Data

Nov. 29, 2006 (KR) .................. 10-2006-0119137

(51) Int. Cl.
*H04J 3/06* (2006.01)
(52) U.S. Cl. .................................. 370/516
(58) Field of Classification Search .......... 370/516
See application file for complete search history.

(56) References Cited

U.S. PATENT DOCUMENTS

| | | | |
|---|---|---|---|
| 5,381,181 A | 1/1995 | Deiss | |
| 7,230,987 B2 * | 6/2007 | Demas et al. | 375/240.28 |
| 2003/0035485 A1 | 2/2003 | Honmura et al. | |
| 2003/0192061 A1 * | 10/2003 | Hwangbo et al. | 725/138 |
| 2006/0136976 A1 * | 6/2006 | Coupe et al. | 725/131 |
| 2006/0285822 A1 * | 12/2006 | Kanemaru et al. | 386/83 |
| 2008/0152304 A1 * | 6/2008 | Yoo et al. | 386/92 |
| 2009/0128572 A1 * | 5/2009 | MacInnis et al. | 345/519 |

FOREIGN PATENT DOCUMENTS

| | | |
|---|---|---|
| EP | 0624982 A2 | 5/1994 |
| EP | 1284578 A1 | 2/2003 |
| JP | 2003-061088 A | 2/2003 |
| KR | 10-0338222 B1 | 9/2002 |

OTHER PUBLICATIONS

"OpenCable Specifications—Multi-Stream CableCARD Interface." Mar. 2005 Retrieved from the Internet: www.opencable.com/downloads/specs/OC-SP-MC-IF-CO1-050331.pdf.
Office Action dated Feb. 15, 2011, in Korean Application No. 10-2006-0119137.

* cited by examiner

*Primary Examiner* — Derrick Ferris
*Assistant Examiner* — Christopher R Crompton
(74) *Attorney, Agent, or Firm* — Sughrue Mion, PLLC

(57) ABSTRACT

A multi-program multiplexing/demultiplexing method and apparatus for preventing MPEG jitters from being generated in a digital broadcast, and a multi-program receiver using the multi-program multiplexing/demultiplexing apparatus are provided. The multi-program multiplexing method comprises: extracting a plurality of transport stream packets from a plurality of channel decoders; comparing a reference clock value of each transport stream packet with a system clock value latched by the reference clock value, and generating a system clock control value; inserting the system clock value into a local packet of each channel; and multiplexing a plurality of local packets of a plurality of channels and generating a multi-program packet.

12 Claims, 7 Drawing Sheets

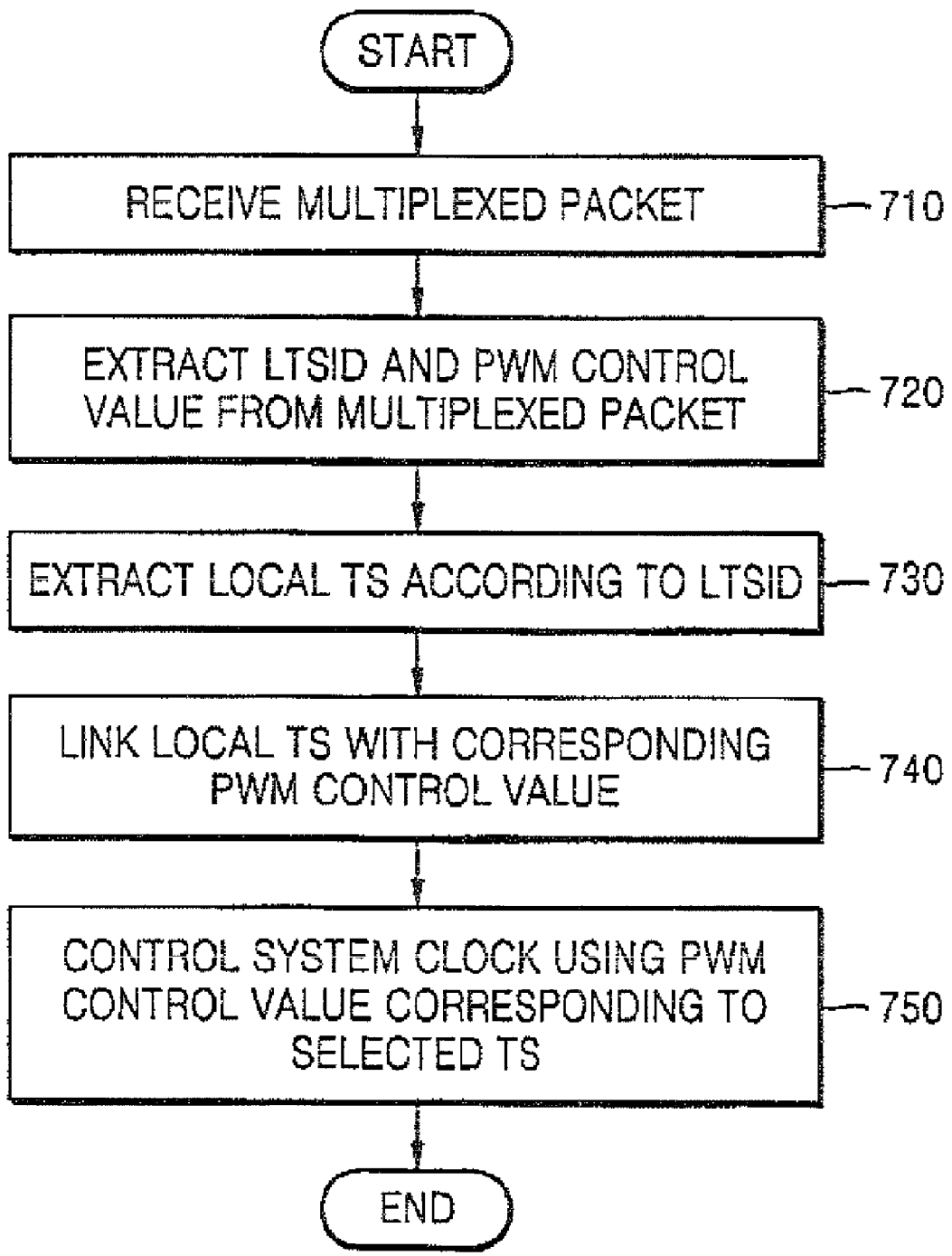

METHOD AND APPARATUS FOR MULTIPLEXING/DEMULTIPLEXING MULTI-PROGRAMS

CROSS-REFERENCE TO RELATED PATENT APPLICATION

This application claims priority from Korean Patent Application No. 10-2006-0119137, filed on Nov. 29, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a digital broadcast reception/transmission system, and more particularly, to a multi-program multiplexing/demultiplexing method and apparatus for preventing MPEG jitters from being generated in digital broadcasts, and a multimedia receiver performing the multi-program multiplexing/demultiplexing method.

2. Description of the Related Art

As digital video/audio compression and digital transmission technologies have been enhanced, digital broadcasts which can provide broadcast services having a higher picture quality, compared to analog broadcasts, and which have high interoperability with digital communication media, digital storage media, etc, have been developed.

In general, a digital broadcast is transmitted in the form of a transport stream encoded based on the MPEG-2 standard.

Recently, the number of broadcast channels has gradually been increasing. Accordingly, a system which can store a plurality of broadcast programs received through a plurality of channels while the programs are being watched is needed. In order to meet the need, broadcast receivers having a Picture In Picture (PIP) function and a double window function are being commercialized.

In general, a cable broadcast system multiplexes programs received through a plurality of channels, and transmits multiplexed transmission streams to a broadcast receiver. At this time, there is a need to minimize Program Clock Reference (PCR) jitters of the multiplexed transmission streams. The PCR is time information for setting a System Time Clock (STC) value of a system decoder to a value suitable for an encoder side.

FIG. 1 is a timing diagram for explaining a related art multi-program multiplexing method which is performed in a related art cable broadcasting system.

Referring to FIG. 1, a plurality of channel decoders (not shown) output a plurality of transport stream packets TS1 to TSn, respectively, according to channel characteristics (for example, their transport stream rates). A Cable Card MPEG Packet (CMP) generator (not shown) adds control information to a transport stream of each channel and generates a CMP. A multiplexer (not shown) then multiplexes CMPs of the respective channels and generates a packet sequence.

The output timing of the multiplexed packet sequence depends on the input order of transport stream packets and the duration of each transport stream packet. However, in the related art multi-program multiplexing method, since uniform time intervals between local transport streams cannot be ensured, MPEG jitters occur. Accordingly, in the related art multi-program multiplexing method, errors occur in clock (27 MHz) locking of an MPEG system, due to such MPEG jitters.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a multi-program multiplexing/demultiplexing method and apparatus for preventing MPEG jitters from being generated by inserting a system clock control value for each channel into a multi-program packet, in a receiver which receives multi-programs.

The present invention also provides a digital signal receiver including a multi-program multiplexer/demultiplexer, for preventing MPEG jitters from being generated.

According to an aspect of the present invention, there is provided a multi-program multiplexing method comprising: extracting a plurality of transport stream packets from a plurality of channel decoders; comparing a reference clock value of each transport stream packet with a system clock value latched by the reference clock value, and generating a system clock control value; inserting the system clock value into a local packet of each channel; and multiplexing a plurality of local packets of a plurality of channels and generating a multi-program packet.

According to another aspect of the present invention, there is provided a multi-program demultiplexing method comprising: receiving a multi-program packet into which a system clock control value for each channel is inserted; extracting the system clock control value and a local transport identifier (ID) from the multi-program packet; extracting a local transport stream packet according to the local transport ID, and linking the local transport stream packet with a corresponding system clock control value; and controlling a system clock signal with reference to a system clock control value corresponding to the local transport stream packet.

According to another aspect of the present invention, there is provided a multi-program multiplexing apparatus comprising: at least one channel decoder unit selecting a broadcast signal of a desired channel from among a plurality of broadcast signals of a plurality of channels, and extracting a transport stream packet from the broadcast signal of the desired channel; a local time stamp generating unit generating a local time stamp according to a synchronization signal of the transport stream packet; a reference clock restoring unit comparing a reference clock value of the transport stream packet, with a system clock value latched by the reference clock value, and generating a system clock control value; a local packet generating unit generating a local packet for each channel, on the basis of the transport stream packet, the local time stamp, and the system clock control value; and a multiplexing unit receiving and multiplexing a plurality of local packets for a plurality of channels, and generating a packet sequence which is synchronized at an output frequency.

According to another aspect of the present invention, there is provided a multi-program demultiplexing apparatus comprising: a packet demultiplexing unit extracting a local transport ID and a system clock control value, from a multi-program packet into which a system clock control value for each channel is inserted; a transport stream demultiplexing unit extracting a local transport stream packet according to the local transport ID; and a clock controller controlling a system clock signal for each channel according to the system clock control value for each channel.

BRIEF DESCRIPTION OF THE DRAWINGS

The above and other aspects of the present invention will become more apparent by describing in detail exemplary embodiments thereof with reference to the attached drawings in which:

FIG. 7 is a flowchart of a multi-program demultiplexing method according to an exemplary embodiment of the present invention.

DETAILED DESCRIPTION OF THE INVENTION

Hereinafter, exemplary embodiments of the present invention will be described in detail with reference to the appended drawings.

A multi-program multiplexing/demultiplexing apparatus according to an exemplary embodiment of the present invention is installed in a receiver. Accordingly, the receiver inserts a clock control value into each transport stream (TS) packet received through a plurality of channels in order to multiplex transport stream packets, and then demultiplexes the multiplexed TS packets. The receiver then generates a system time clock signal (hereinafter, referred to as a system clock signal) of 27 MHz that is to be synchronized with an oscillation frequency of 27 MHz which is used in a transmitter, in order to correctly restore a received signal. Accordingly, the transmitter transmits a Program Clock Reference (PCR) signal to the receiver so that a Phase Locked Loop (PLL) circuit of the receiver that will restore the system clock signal of 27 MHz can use the PCR signal as a reference clock signal.

Figure 1:
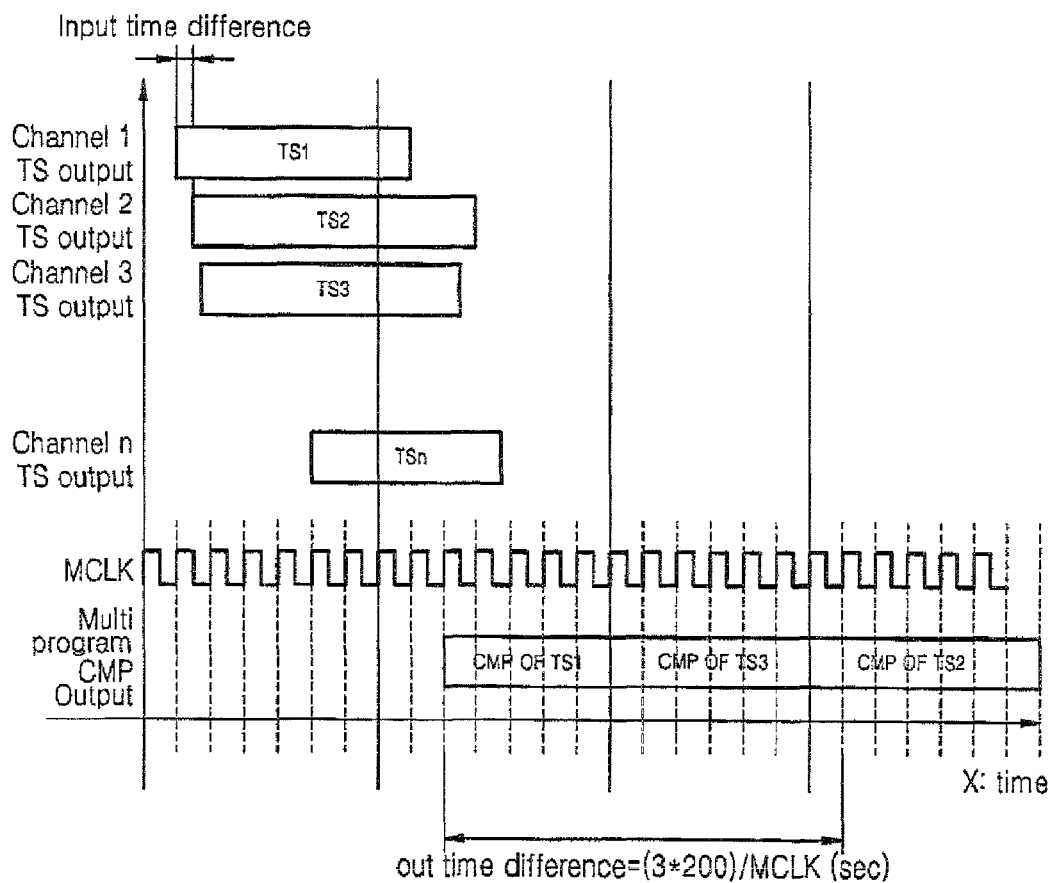
FIG. 1 is a timing diagram for explaining a related art multi-program multiplexing method which is performed by a related art cable broadcast system.
Figure 2:
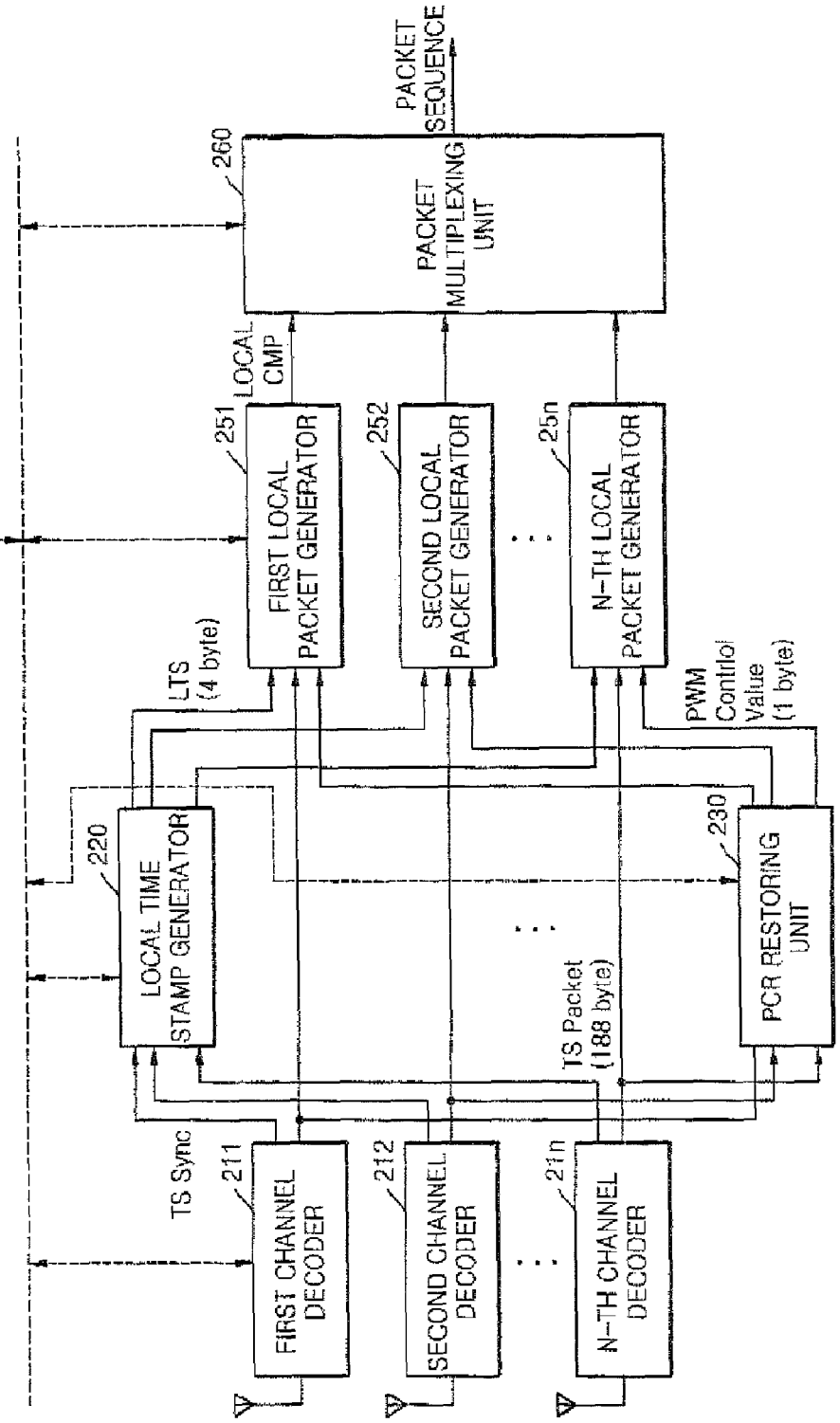
FIG. 2 is a block diagram of a multi-program multiplexing apparatus according to an exemplary embodiment of the present invention.

FIG. 2 is a block diagram of a multi-program multiplexing apparatus according to an exemplary embodiment of the present invention.

Referring to FIG. 2, the multi-program multiplexing apparatus includes first, second, through to n-th channel decoders 211, 212, through to 21n, a local time stamp generator 220, a Program Clock Reference (PCR) restoring unit 230, first, second, through to n-th local packet generators 251, 252, through to 25n, a controller 240, and a packet multiplexing unit 260.

The first through n-th channel decoders 211 through 21n select broadcast signals of desired channels from among a plurality of broadcast signals received through a plurality of antennas, and extracts MPEG TS packets from the broadcast signals. Each MPEG TS packet includes a header area and a payload area. The header area includes 4 bits of a header and an additional header having a PCR value, and the payload area includes 188 bytes of video/audio signals. The header also includes a synchronization signal indicating a start location of the MPEG TS packet.

The local time stamp generator 220 generates a local time stamp value for the MPEG TS packet of each channel extracted by the first through n-th channel decoders 211 through 21n, according to the synchronization signal of the MPEG TS packet of each channel. Here, 4 bytes are assigned to the local time stamp value.

The PCR restoring unit 230 extracts a PCR value from the MPEG TS packet extracted by the first through n-th decoders 211 through 21n, compares a System Time Clock (STC) value latched (e.g., stored or saved) when the PCR value is extracted, and generates a Pulse Width Modulation (PWM) control value. The STC value is system clock information for lip synchronization of a received audio/video signal. The PWM control value represents the characteristic of a system clock signal for each channel.

The first through n-th packet generators 251 through 25n generate a local packet for each channel, using the 188 bytes of the MPEG TS packets generated by the first through n-th channel decoders 211 through 21n, the local time stamp value for each channel generated by the local time stamp generator 220, the PWM control value generated by the PCR restoring unit 230, and additional information generated by the controller 240. The local packet may be a Cable Card MPEG Packet (CMP) which is applied to a cable broadcast receiver.

The packet multiplexing unit 260 multiplexes local packets of n channels generated by the first though n-th local packet generators 251 through 25n, and generates a packet sequence which is synchronized at an output frequency.

The controller 240 controls the operation of the first through n-th channel decoders 211 through 21n, the local time stamp generator 220, the reference clock restoring unit 230, the first through n-th local packet generators 251 through 25n, and the packet multiplexing unit 260, and generates additional information.

Figure 3:
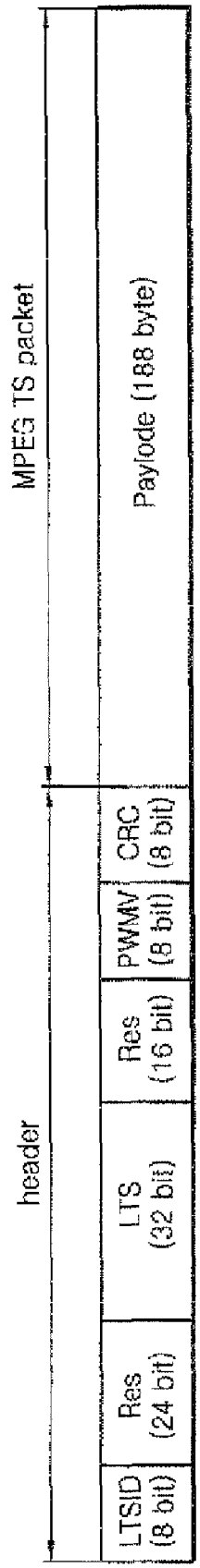
FIG. 3 illustrates a signal format generated by local packet generators, according to an exemplary embodiment of the present invention.

FIG. 3 illustrates a signal format of a local packet generated by the first through n-th local packet generators 251 through 25n, according to an exemplary embodiment of the present invention.

Referring to FIG. 3, the local packet includes a header and an MPEG TS packet. The header includes 8 bits of a local TS ID area (LTSID), 24 bits of a reserved area (Res), 32 bits of a local time stamp area (LTS), 16 bits of a reserved area (Res), 8 bits of a PWM control value area (PWMV), and 8 bits of a Cyclic Redundancy Check (CRC) value. The MPEG TS packet includes 188 bytes of payload data.

Figure 4:
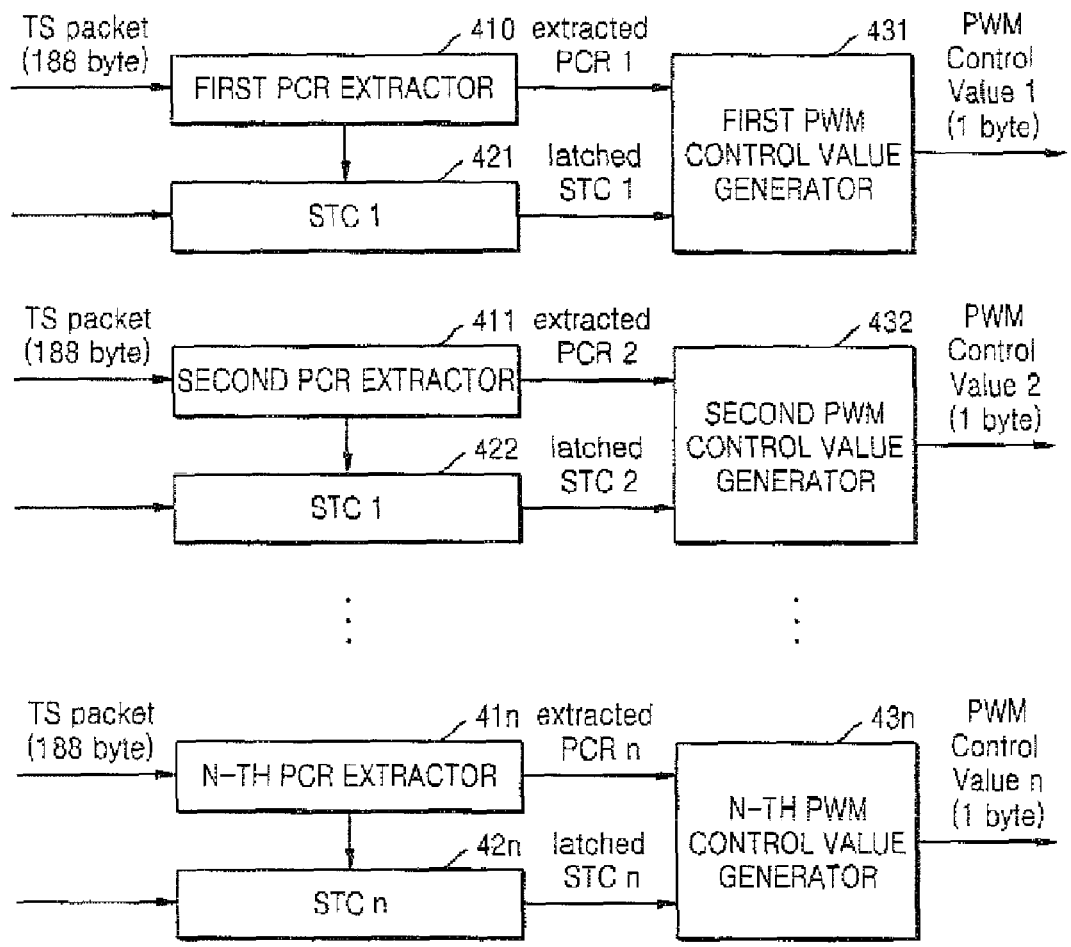
FIG. 4 is a detailed block diagram of a Program Clock Reference (PCR) restoring unit illustrated in FIG. 2.

FIG. 4 is a detailed view of the PCR restoring unit 230 illustrated in FIG. 2.

Referring to FIG. 4, the PCR restoring unit 230 includes first, second, through to n-th PCR extractors 410, 411, through to 41n, first, second, through to n-th STC generators 421, 422, through to 42n, and first, second, through to n-th PWM control value generators 431, 432, through to 43n.

The first through n-th PCR extractors 410 through 41n extract PCR values from the 188 bytes of TS packets received through a plurality of channels.

The first through n-th STC generators 421 through 42n latch STC values, when the PCR values extracted by the first through n-th PCR extractors 410 through 41n are output.

The first through n-th PWM control value generators 431 through 43n compare the PCR values extracted by the first through n-th PCR extractors 410 through 41n with the STC values latched by the first through n-th STC generators 421 through 42n, generate error values according to the comparison result, and convert the error values into PWM control values. Accordingly, the first through n-th PWM control value generators 431 through 43n generate PWM control values, each PWM control value having 1 byte corresponding to a clock control value for each channel.

Figure 5:
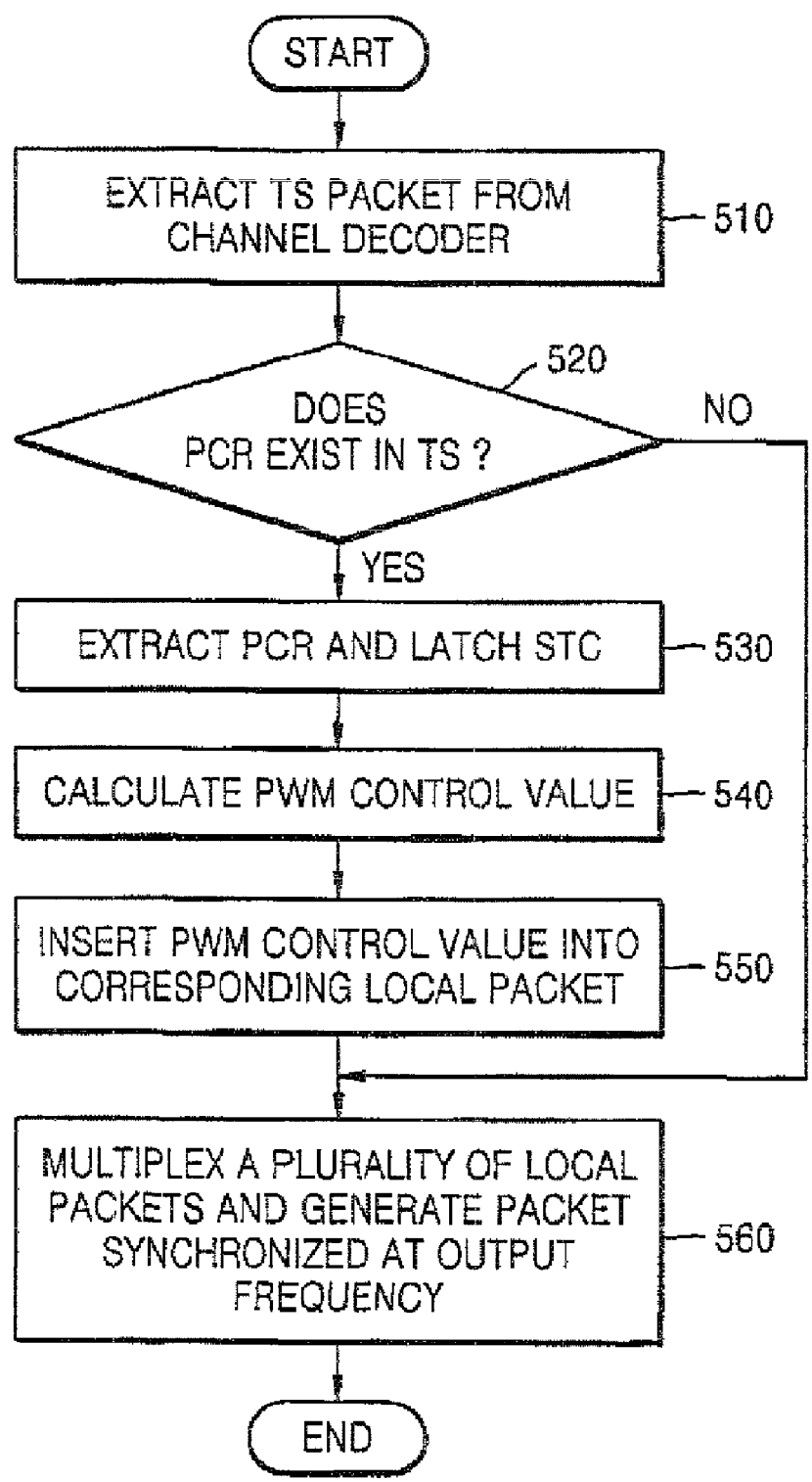
FIG. 5 is a flowchart of a multi-program multiplexing method according to an exemplary embodiment of the present invention.

FIG. 5 is a flowchart of a multi-program multiplexing method according to an exemplary embodiment of the present invention.

First, a plurality of TS packets are respectively extracted from a plurality of channel decoders (operation 510).

Successively, it is determined whether a PCR value exists in each TS packet (operation 520).

If a PCR value exists in a TS packet, the PCR value is extracted from the TS packet (operation 530). Meanwhile, if no PCR value exists in any TS packet, packet multiplexing is performed (operation 560).

When the PCR value is extracted, a STC value is latched (operation 530).

Then, the PCR value extracted for each channel is compared with the latched STC value, an error value is generated according to the comparison result, and a PWM control value corresponding to the error value is calculated (operation 540). The PWM control value corresponds to a control value of a system clock signal.

Then, the PWM control value is inserted into the corresponding local packet (operation 550).

Accordingly, a local packet, as illustrated in FIG. 3, includes an MPEG TS packet generated by the corresponding channel decoder, a local time stamp value LTS, a PWM control value PWMV, etc.

Successively, local packets of a plurality of channels are multiplexed, and a multi-program packet which is synchronized at an output frequency is generated (operation 560).

Figure 6:
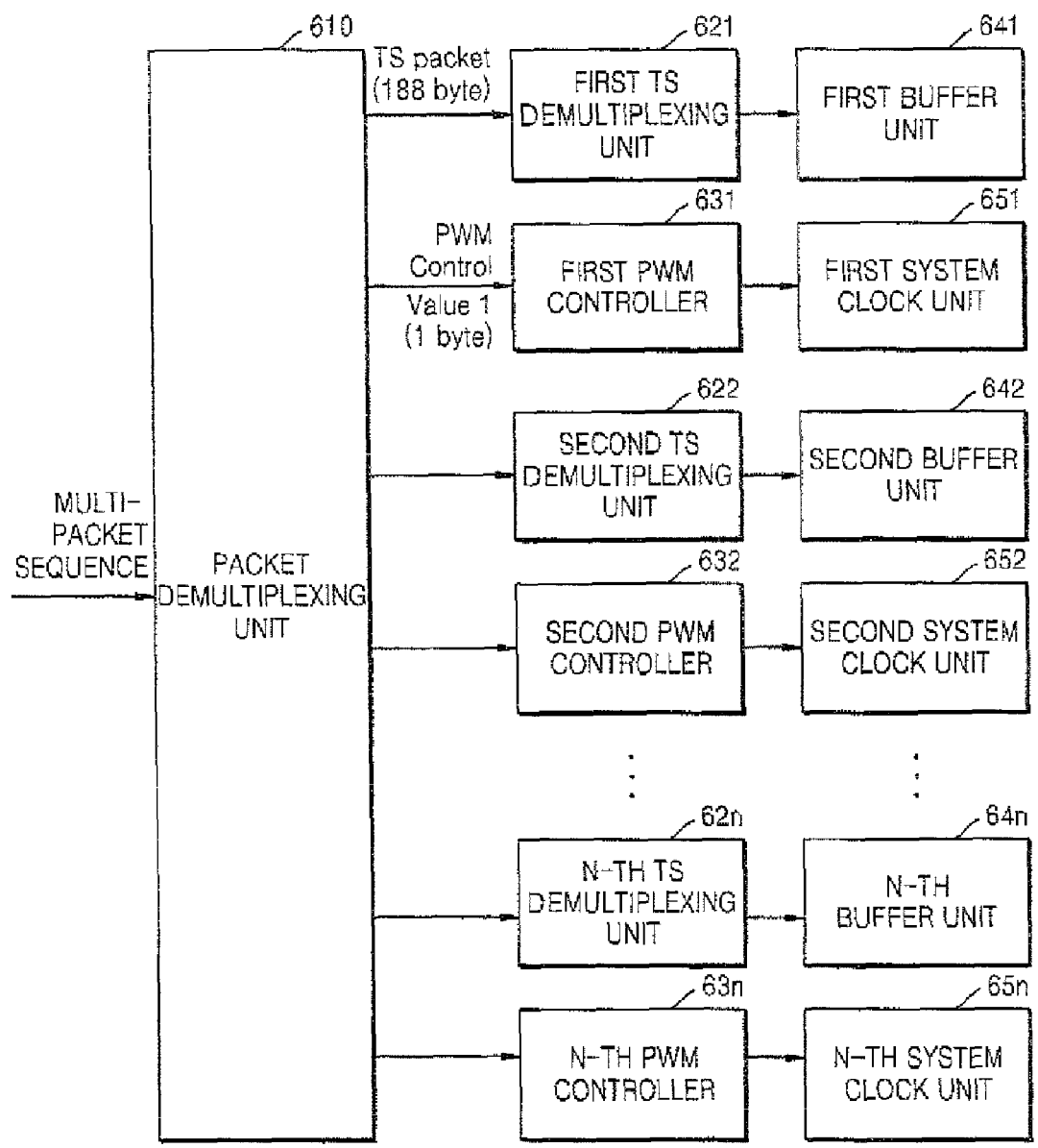
FIG. 6 is a block diagram of a multi-program demultiplexing apparatus according to an exemplary embodiment of the present invention.

FIG. 6 is a block diagram of a multi-program demultiplexing apparatus according to an exemplary embodiment of the present invention.

Referring to FIG. 6, the multi-program demultiplexing apparatus includes a packet demultiplexing unit 610, first, second, through to n-th TS demultiplexing units 621, 622, through to 62n, first, second, through to n-th PWM controllers 631, 632, through to 63n, first, second, through to n-th buffer units 641, 642, through to 64n, and first, second, through to n-th system clock units 651, 652, through to 65n.

The packet demultiplexing unit 610 extracts a header from a received multi-packet sequence, and divides the multi-packet sequence into a plurality of local TS packets according to LTSID. Also, the packet demultiplexing unit 610 extracts a PWM control value for each local channel from the header.

The first through n-th TS demultiplexing units 621 through 62n parse the TS packets for respective channels extracted by the packet demultiplexing unit 610, to Elementary Streams (ESs), section streams, etc., according to audio data, video data, Program Specific Information (PSI), etc.

Each of the first through n-th PWM controllers 631 through 63n includes a PWM generator (not shown) and a Low Pass Filter (LPF) (not shown), generates a PWM signal according to a PWM control value of each channel extracted by the packet demultiplexing unit 610, performs low-pass filtering on the PWM signal, and generates an analog voltage signal.

The first through n-th system clock units 651, 652, through to 65n drive a voltage controlled crystal oscillator (VCXO) (not shown) according to analog voltage signals generated by the first through n-th PWM controllers 631 through 63n, and generate system clock signals for the respective local channels through the VCXO. The system clock signals restore video/audio signals for the respective local channels.

The first through n-th buffer units 641 through 64n store the ESs or section streams parsed by the first through n-th TS demultiplexing units 621 through 62n.

FIG. 7 is a flowchart of a multi-program demultiplexing method according to an exemplary embodiment of the present invention.

First, a multi-program packet into which a PWM control value is inserted for each channel is received (operation 710).

Successively, a local TS ID and a PWM control value are extracted from the multi-program packet (operation 720).

A local TS packet is then extracted according to the local TS ID (operation 730), and the local TS packet is linked with the corresponding PWM control value (operation 740).

Next, a system clock signal is controlled using a PWM control value corresponding to the local TS packet that is to be reproduced (operation 750).

The exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the exemplary embodiments of the present invention, in a receiver which receives multi-programs through a plurality of channels, compares a PCR with an STC for each channel and inserts a PWM control value corresponding to a clock error into a multi-program packet, it is possible to prevent clock locking errors from being generated due to MPEG jitters generated in multi-program multiplexing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-program multiplexing method comprising:
extracting a plurality of transport stream packets from a plurality of channel decoders;
comparing reference clock values of the plurality of transport stream packets with system clock values, and generating system clock control values corresponding to error values for each channel according to the comparing;
inserting the system clock control values into headers of a plurality of local packets of channels; and
multiplexing the plurality of local packets of the channels and generating a multi-program packet,
wherein the system clock control values are pulse-width modulation (PWM) control values.

2. The multi-program multiplexing method of claim 1 further comprising:
extracting the reference clock values from the plurality of transport stream packets and;
latching the system clock values when the reference clock values are extracted, wherein the comparing comprises comparing the reference clock values with the system clock values and generating error values according to a result of the comparing; and
the generating comprises generating the system clock control values for the channels based on the error values.

3. The multi-program multiplexing method of claim 2, wherein the system clock control values are pulse-width modulation (PWM) control values for controlling errors of system clock signals.

4. The multi-program multiplexing method of claim 1, wherein one of the plurality of the local packets includes a transport stream, a local time stamp, and a system clock control value, for one of the channels.

5. The multi-program multiplexing method of claim 1, wherein a number of the plurality of transport stream packets and a number of the plurality of channel decoders are same.

6. The multi-program multiplexing method of claim 1, wherein each of the system clock values are inserted into a corresponding one of the plurality of local packets of channels.

7. A multi-program demultiplexing method comprising:
receiving a multi-program packet into which a system clock control value corresponding to an error value for a channel is inserted;
extracting the system clock control value and a local transport identifier (ID) from the multi-program packet;
extracting a local transport stream packet according to the local transport ID, and linking the local transport stream packet with the system clock control value; and
controlling a system clock signal with reference to the system clock control value corresponding to the local transport stream packet,
wherein the system clock control value is a pulse-width modulation (PWM) control value extracted from a header of the multi-program packet.

8. A multi-program multiplexing apparatus comprising:
at least one channel decoder unit which selects a broadcast signal of at least one desired channel from among a plurality of broadcast signals of a plurality of channels, and extracts a transport stream packet from the broadcast signal of the at least one desired channel;
a local time stamp generating unit which generates a local time stamp, according to a synchronization signal of the extracted transport stream packet;
a reference clock restoring unit which compares a reference clock value of the transport stream packet, with a system clock value, and generates a system clock control value corresponding to an error values for a channel according to the comparison;
a local packet generating unit which generates a local packet for the one desired channel, based on the transport stream packet, the local time stamp, and the system clock control value; and
a multiplexing unit which receives and multiplexes a plurality of local packets for a plurality of desired channels, and generates a packet sequence which is synchronized at an output frequency,
wherein the system clock control value is a pulse-width modulation (PWM) control value and is inserted into a header of the local packet.

9. The multi-program multiplexing apparatus of claim 8, wherein the reference clock restoring unit comprises:

a reference clock extracting unit which extracts the reference clock value from the transport stream packet for the at least one desired channel;
a system clock generator which latches the system clock value when the reference clock value is extracted; and
a clock control value generator which compares the reference clock value with the system clock value to generate a result, generates an error value according to the result, and generates the system clock control value for the one desired channel based on the error value.

10. A multi-program demultiplexing apparatus comprising:
a packet demultiplexing unit which extracts a local transport identifier (ID) and a system clock control value, from a multi-program packet into which a system clock control value corresponding to an error value for a desired channel is inserted;
a transport stream demultiplexing unit which extracts a local transport stream packet according to the local transport ID; and
a clock controller which controls a system clock signal for the desired channel, according to the system clock control value for the desired channel,
wherein the system clock control value is a pulse-width modulation (PWM) control value extracted from a header of the multi-program packet.

11. The multi-program demultiplexing apparatus of claim 10, wherein the clock controller comprises:
a pulse-width modulator (PWM) generator which generates a pulse-width modulation signal, according to the system clock control value for the desired channel; and
a low-pass filter which performs low-pass filtering on the PWM signal.

12. A multi-program receiving apparatus comprising:
a multiplexing unit which extracts transport stream packets through a plurality of channel decoders, compares reference clock values of the plurality of transport stream packets with system clock values to generate a comparison result, generates system clock control values corresponding to error values for each channel according to the comparison result, inserts the system clock control values into headers of local packets for desired channels, multiplexes the local packets of the desired channels, and generates a multi-program packet; and
a demultiplexing unit which receives the multi-program packet into which the system clock control values for the desired channels are inserted, from the multiplexing unit, extracts local transport identifiers (IDs) and the system clock control values from the multi-program packet, extracts the local packets according to the local transport IDs, links the local packets with the system clock control values, and controls system clock signals with reference to the system clock control values which correspond to the local packets,
wherein the system clock control values are pulse-width modulation (PWM) control values.

* * * * *